(12) United States Patent
Yu et al.

(10) Patent No.: US 7,422,485 B2
(45) Date of Patent: Sep. 9, 2008

(54) MEMORY CARD CONNECTOR WITH IMPROVED STRUCTURE

(75) Inventors: Jian-Fei Yu, Kunshan (CN); Qi-Jun Zhao, Kunshan (CN); Mao-Lin Lei, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/811,574

(22) Filed: Jun. 11, 2007

(65) Prior Publication Data

US 2007/0287312 A1 Dec. 13, 2007

(51) Int. Cl.
*H01R 13/62* (2006.01)
(52) U.S. Cl. ........................... 439/630; 439/159
(58) Field of Classification Search .......... 439/630, 439/159, 160
See application file for complete search history.

(56) References Cited

U.S. PATENT DOCUMENTS

| | | | | |
|---|---|---|---|---|
| 6,805,589 B2* | 10/2004 | Lee | ............ | 439/630 |
| 7,001,218 B2* | 2/2006 | Kato et al. | ............ | 439/630 |
| 7,044,796 B2* | 5/2006 | Tsai | ............ | 439/630 |
| 7,052,295 B1* | 5/2006 | Lin | ............ | 439/159 |
| 2006/0166559 A1* | 7/2006 | Nakai et al. | ............ | 439/630 |
| 2006/0194478 A1* | 8/2006 | Ting | ............ | 439/630 |
| 2007/0218768 A1* | 9/2007 | Lee | ............ | 439/630 |

FOREIGN PATENT DOCUMENTS

CN 2751459 Y 1/2006

\* cited by examiner

*Primary Examiner*—Gary F. Paumen
(74) *Attorney, Agent, or Firm*—Wei Te Chung

(57) ABSTRACT

A memory card connector (100) for insertion of a memory card (8) includes an insulative housing (1) defining a cavity (110) for receiving the memory card and a side wall (11), a contact module (2), a pair of switch contacts (5) and a card eject mechanism (3). The side wall defines a cutout (110) and a pair of first and second protrusions (111, 112) extending into the cutout to form a pair of retaining apertures (1101, 1102) below corresponding first and second protrusions. The contact module includes a side portion (211) received in the cutout (110). The side portion further includes a pair of projecting blocks (2111, 2112) laterally received in the retaining apertures for stable assembly.

14 Claims, 6 Drawing Sheets

MEMORY CARD CONNECTOR WITH IMPROVED STRUCTURE

BACKGROUND OF THE INVENTION

1. Field of the Invention

This invention generally relates to a memory card connector, and more particularly to a memory card connector with improved structure.

2. Description of the Prior Art

Chinese Pat. No. CN 2751459 Y discloses a conventional memory card connector mounted on a printed circuit board (PCB). The memory card connector comprises an insulative housing having a pair of side walls and a card receiving cavity between said side walls and a contact module assembled to the insulative housing. The contact module includes a plurality of contacts and a beam over-molding the contacts. Each contact includes a contact portion protruding into the card receiving cavity, an extending portion perpendicular to the beam and a soldering tail perpendicular to the extending portion. The extending portion of each contact is long and cantilevered protrudes from the beam. When the contact module is assembled to the insulative housing, the long cantilevered extending portions may easily deform resulted in outer force so that the soldering tails cannot be coplanar with the PCB.

Hence, it is desired to have a memory card connector solving the problem above.

BRIEF SUMMARY OF THE INVENTION

Accordingly, an object of the present invention is to provide a memory card connector with stable structure for easily assembly.

In order to attain the object above, a memory card connector for insertion of a memory card comprises an insulative housing defining a card receiving cavity, a contact module, a pair of switch contacts, a card eject mechanism and a metal shield enclosing the insulative housing. The insulative housing includes a pair of first and second side walls. The first side wall defines a first cutout and first and second protrusions extending into the first cutout to form a pair of first and second retaining apertures positioned below corresponding first and second protrusions for mating with the contact module. The second side wall defines a second cutout and a third protrusion extending into the third protrusion to form a third retaining aperture below the third protrusion. The contact module includes a main portion and a pair of first and second side portions respectively received in the first and second cutouts. The first side portion comprises a pair of first and second projecting blocks extending from a bottom edge thereof to be received in the corresponding first and second retaining apertures. The second side portion includes a third projecting blocks received in the third retaining aperture. The contact module can be laterally attached to the insulative housing for easily assembly. As a result, the contact module can be prevented from up and down movement.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Reference will now be made in detail to the preferred embodiment of the present invention.

Figure 1:
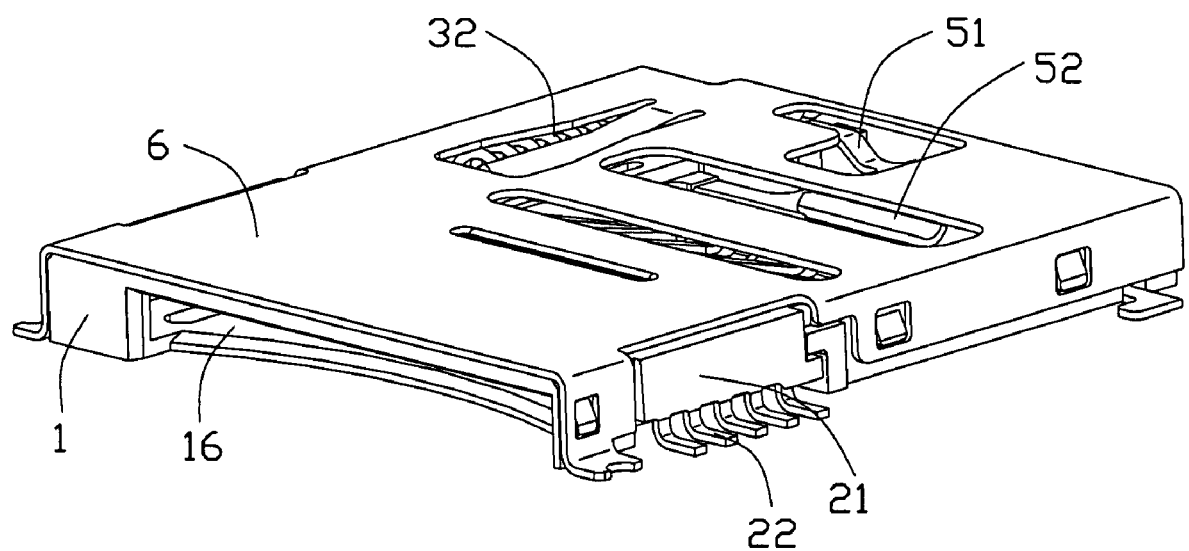
FIG. 1 is a front, perspective view of a memory card connector according to a preferred embodiment of the present invention.
Figure 2:
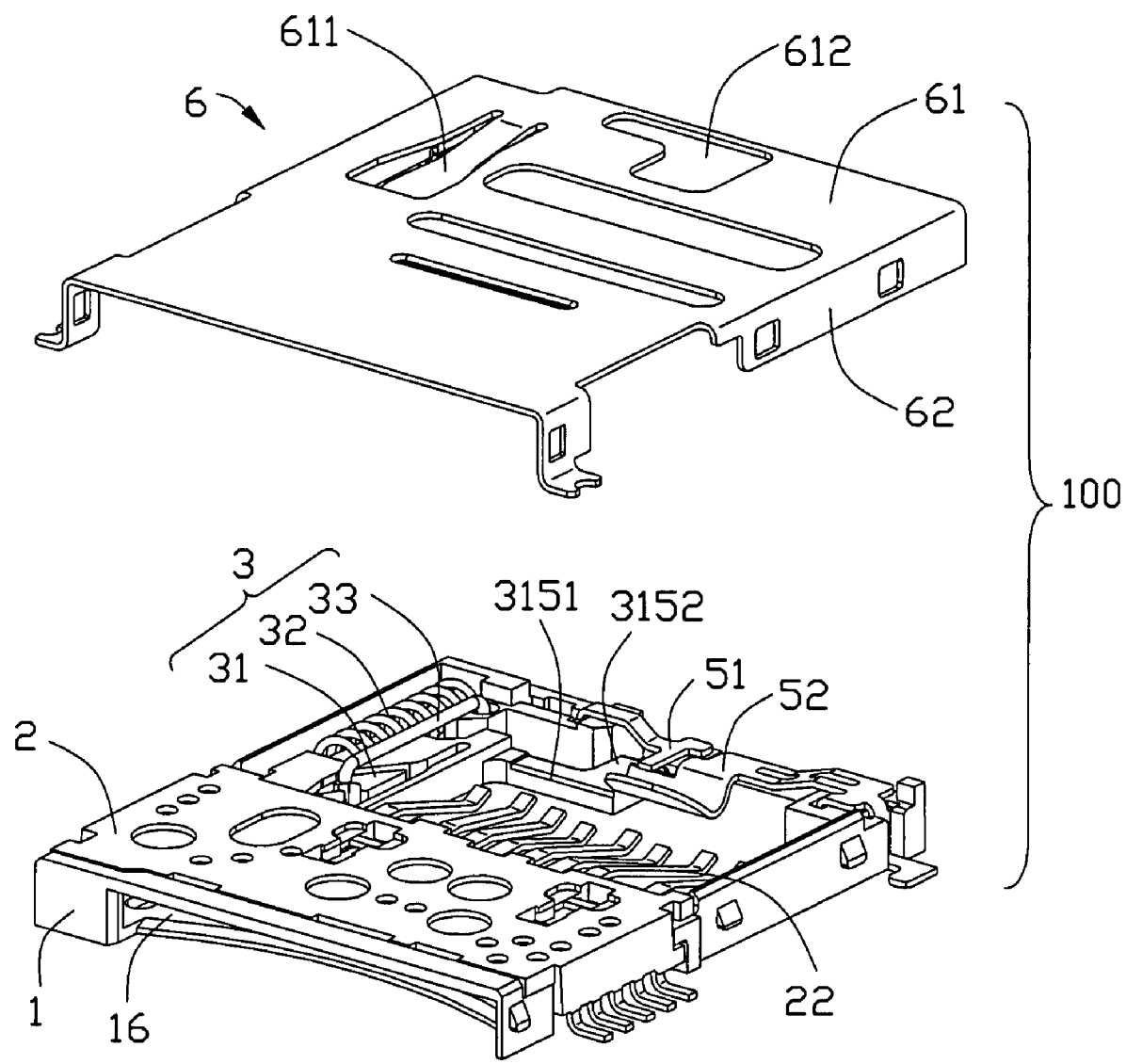
FIG. 2 is a partly exploded view of the memory card connector before a metal shield mounted thereon.
Figure 3:
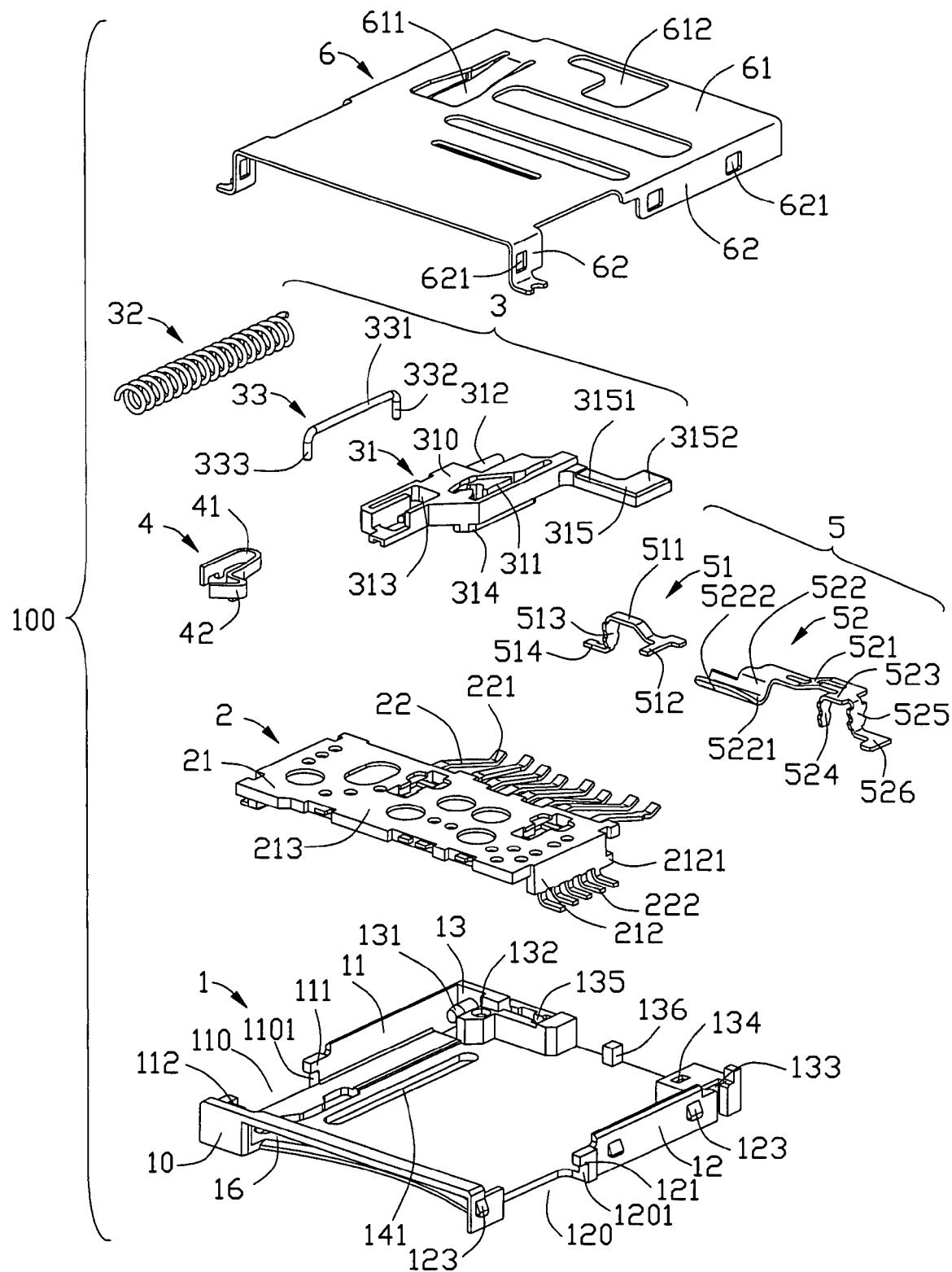
FIG. 3 is an exploded view of the memory card connector shown in FIG. 1.

Referring to FIGS. 1 to 3, a memory card connector 100 mounted on a PCB 7 (shown in FIG. 6) for receiving a memory card 8 comprises an insulative housing 1, a contact module 2, a card eject mechanism 3, a card lock member 4, a pair of switch contacts 5 retained in the insulative housing 1 and a metal shield 6 enclosing the insulative housing 1.

The insulative housing 1 includes a mating face 10, a pair of first and second side walls 11, 12 extending backwardly from the mating face 10, a discontinuous rear wall 13 opposite to the mating face 10 and a card receiving cavity 16 defined in a mounting wall 14 and extending along a card insertion direction for receiving the memory card 8. The first side wall 11 defines a first cutout 110 adjacent to the mating face 10. A pair of first and second protrusions 111, 112 extend parallel to the card insertion direction and project into the cutout 110 to form first and second retaining apertures 1101, 1102 in communication with the first cutout 110. The first and second retaining apertures 1101, 1102 are positioned below corresponding first and second protrusions 111, 112 for mating with the contact module 2. The second side wall 12 defines a second cutout 120 with respect to the first cutout 110. A third protrusion 121 extends along the card insertion direction. The third protrusion 121 projects into the second cutout 120 to form a third retaining aperture 1201 in communication with the second cutout 120 for mating with the contact module 2. The first, second and third protrusions 111, 112 and 121 are rectangular shaped. The mounting wall 14 further defines a guiding slot 141 for guiding movement of the card eject mechanism 3. The rear wall 13 defines a first mounting slit 135 and a pair of second mounting slits 133, 134 for holding the switch contacts 5.

Referring to FIGS. 2 to 5, the contact module 2 comprises a plurality of contacts 22 and a beam 21 over-molding the contacts 22. The beam 21 includes a horizontal main portion 213 and a pair of first and second side portions 211, 212 downwardly extending from lateral edges of the main portion 213. The first and second side portions 211, 212 are adapted for mating with the first and second cutouts 110, 120, respectively. The first side portion 211 includes a pair of first and second projecting blocks 2111, 2112 extending from a bottom edge thereof and extending along opposite directions parallel to the card insertion direction. The first and second projecting blocks 2111, 2112 are respectively received in the first and second retaining apertures 1101, 1102. The second side portion 212 includes a third projecting block 2121 extending from a bottom edge thereof to be received in the third retaining aperture 1201. The contacts 22 include a plurality of contact portions 221 extending into the card receiving cavity 16 for electrically mating with the memory card 8 and a plurality of soldering portions 222 extending sidewardly beyond the first and second side portions 211, 212 to be soldered to the PCB 7.

The card eject mechanism 3 comprises a slider 31, an elastic member which is a coiled spring 32 in the preferred embodiment and a link rod 33. The slider 31 includes a body portion 310 and an L-shaped projection 315 extending laterally from a front side of the body portion 310. The body portion 310 includes a heart-shaped cam 311 recessed in a top face thereof and a projecting 314 extending downwardly from a bottom face of the body portion 310. The L-shaped projection 315 includes an actuation portion 3151 for abutting against the memory card 8 and an extending portion 3152 perpendicular to the actuation portion 3151 for mating with the switch contacts 5. The projecting 314 is movably received in the guiding slot 141 to make sure that the slider 31 moves along a front-to-back direction. Besides, a U-shaped recess 313 is defined in the body portion 310 of the slider 31 to retain the card lock member 4.

The coiled spring 32 gives the slider 31 elastic force to realize ejecting the memory card 8 from the memory card connector 100. In order to fix the coiled spring 32 in the memory card connector 100, the rear wall 13 of the insulative housing 1 and the slider 31 include first and second fixing posts 131, 312, respectively. The coiled spring 32 is assembled between the first and second fixing posts 131, 312.

The link rod 33 includes a middle portion 331, a first hook 332 and a second hook 333 downwardly bending from opposite ends of the middle portion 331. The first hook 332 is inserted into a mounting hole 132 of the insulative housing 1 for retaining purpose. The second hook 333 can move in the heart-shaped cam 311. The working theory of the card eject mechanism 3 is obvious to the people in the art, so the detailed description is omitted hereinafter.

The card lock member 4 is received in the U-shaped recess 313 of the slider 31 and comprises a stationary portion 41 and a locking portion 42 at a distal end of the stationary portion 41. The locking portion 42 protrudes into the card receiving cavity 16 for holding the memory card 8 when it is inserted into the memory card connector 100.

Figure 4:
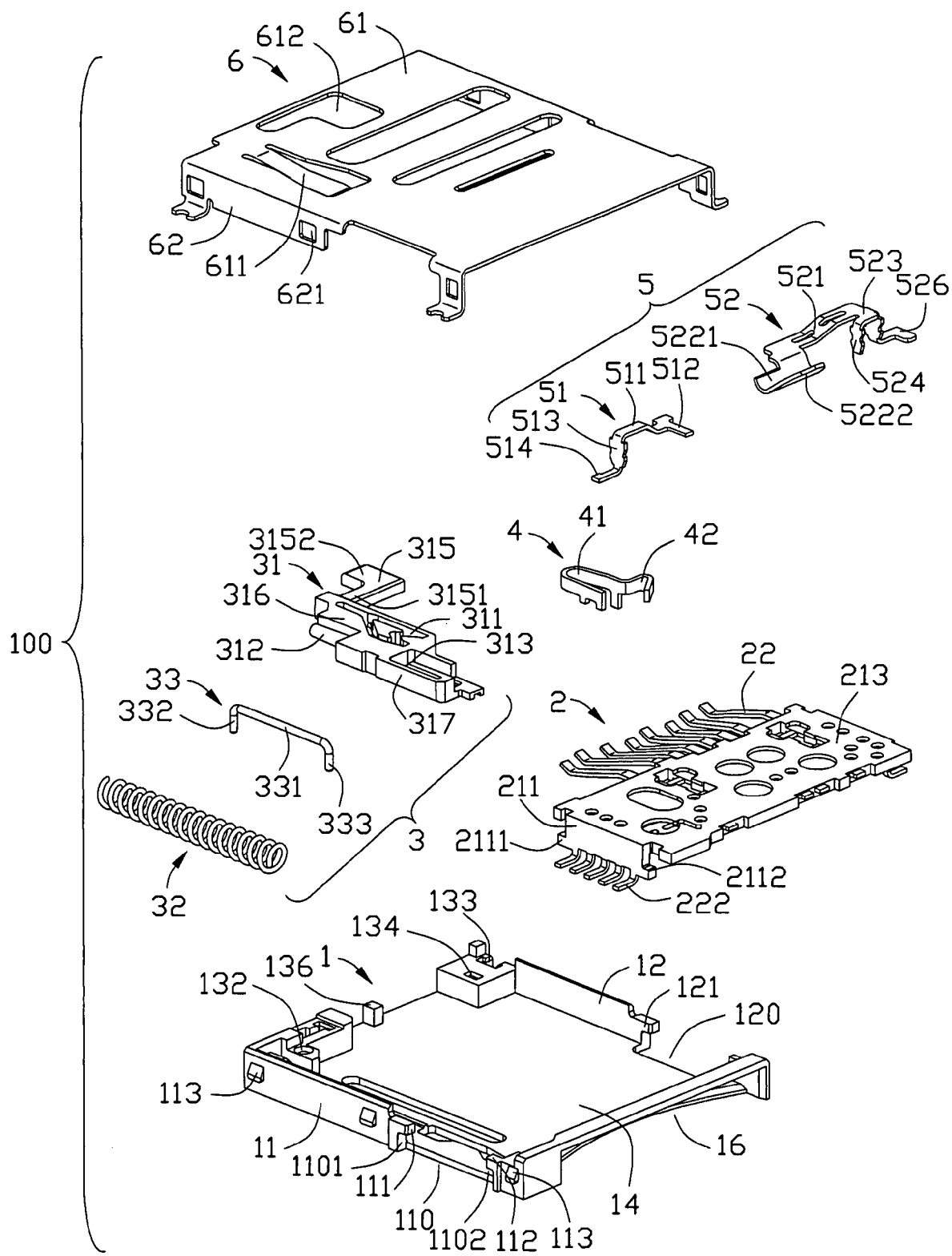
FIG. 4 is similar to FIG. 3, but viewed from another aspect.
Figure 5:
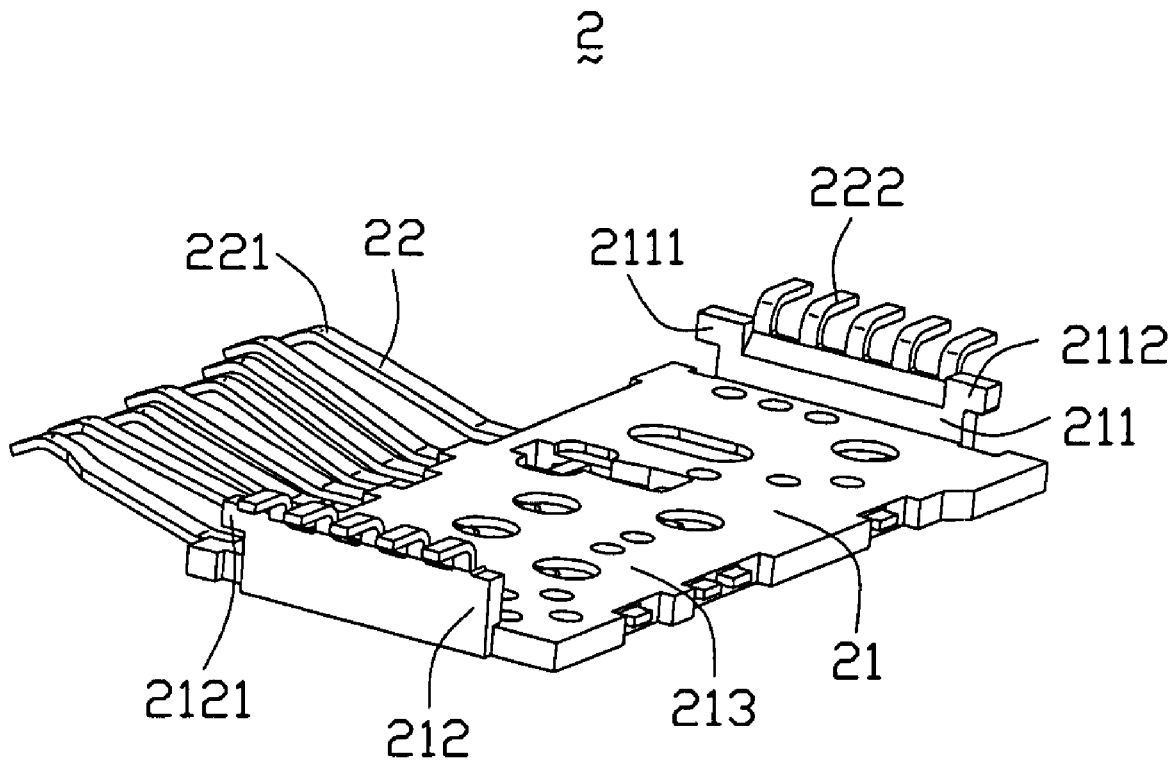
FIG. 5 is an enlarged, perspective view of a contact module.

Referring to FIGS. 3 and 4, the pair of switch contacts 5 include a first switch contact 51 and a second switch contact 52 disposed below the first switch contact 51. The first switch contact 51 includes a base 511, a first contact section 512 perpendicular to the base 511, a first retaining section 513 bending downwardly from the base 511 and a first soldering tail 514 perpendicular to the first retaining section 513. The first retaining section 513 is received in the first mounting slit 135 so that the first switch contact 51 can be fixed in the insulative housing 1. The second switch contact 52 includes a second base 521, a spring arm 522 cantilevered extending forwardly from one side of the second base 521 and a protrusion 523 extending forwardly from the other side of the second base 521. The rear wall 13 further includes a block 136 for supporting the second base 521. The spring arm 522 includes an engaging section 5221 extending downwardly for abutting against the inserted memory card 8, and a second contact section 5222 detachably engaging with the first contact section 512. The protrusion 523 includes a pair of second retaining sections 524, 525 received in the corresponding second mounting slits 134, 133 of the insulative housing 1, and a second soldering tail 526 perpendicular to the second retaining section 525. Both of the first and second soldering tails 514, 526 extend beyond the insulative housing 1 to be soldered to the PCB 7.

The metal shield 6 includes a top wall 61 and a pair of side walls 62 bending from lateral edges of the top wall 61. The top wall 61 includes an inward cantilever 611 for pressing the middle portion 331 of the link rod 33 to prevent it from falling out. A through hole 612 is defined in the top wall 61 corresponding to the first contact section 512 in order to provide additional space for the first contact section 512 deformed therein. Besides, the side walls 62 define a plurality of holes 621 and the first and second side walls 11, 12 of the insulative housing include a plurality of corresponding blocks 113, 123 received in the holes 621 so that the metal shield 6 can be stably attached to the insulative housing 1.

In assembly, the card eject mechanism 3 is mounted on the mounting wall 14 of the insulative housing 1. One end of the coiled spring 32 abuts against the first fixing post 131 and the other end abuts against the second fixing post 312 of the slider 31. The card lock member 4 is received in the U-shaped recess 313 of the slider 31 with the locking portion 42 protruding into the card receiving cavity 16 for mating with the memory card 8. The switch contacts 5 are retained in the rear wall 13 of the insulative housing 1, wherein the second contact section 5222 is positioned below the first contact section 512 and the engaging section 5221 of the second contact section 5222 extends into the card receiving cavity 16 for abutting against the inserted memory card 8. In this condition, the first switch contact 51 disengages from the second switch contact 52 at initial position. The contact module 2 is assembled to the insulative housing 1, which includes two steps: firstly, the main portion 213 is positioned over the mechanism 3. The first side portion 211 is adapted out of the first side wall 11 with the first and second projecting blocks 2111, 2112 laterally corresponding to the first and second retaining apertures 1101, 1102 and the third projecting block 2121 laterally corresponding to the third retaining aperture 1201. Secondly, The contact module 2 is pushed by a lateral force to make the first and second projecting blocks 2111, 2112 received in the first and second retaining apertures 1101, 1102 and the third projecting block 2121 received in the third retaining aperture 1201. In this circumstance, the first and second protrusions 111, 112 are positioned over the first and second projecting blocks 2111, 2112, and the third protrusion 121 is positioned over the third projecting block 2121 so that the contact module 3 can be prevented from up and down movement. Besides, the main portion 213 of the beam 21 presses the slider 31 so that the slider 31 can't warp upwardly under the elastic force of the coiled spring 32. The metal shield 6 is assembled to press the contact module 2 in order that the contact module 2 can be more stably retained in the insulative housing 1.

Figure 6:
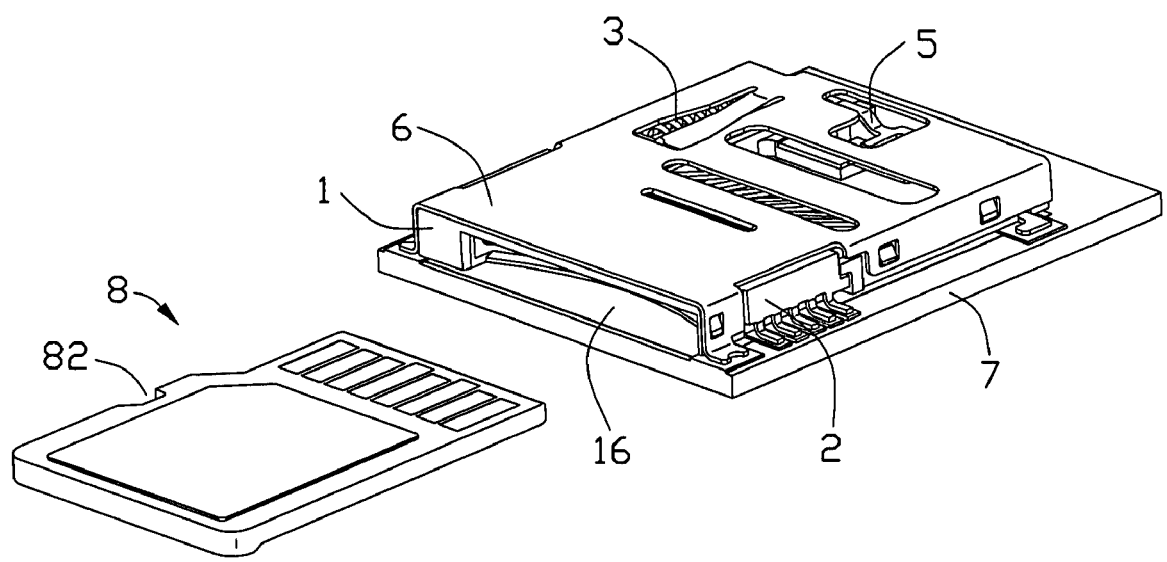
FIG. 6 is a perspective view of the memory card connector mounted on a printed circuit board (PCB) showing a memory card detached from the memory card connector.

Referring to FIG. 6, in use, when the memory card 8 is inserted into the card receiving cavity 16 through the mating face 10, the actuation portion 3151 is driven by the front edge of the memory card 8. The extending portion 3152 is simultaneously driven to abut against the engaging section 5221 of the second contact 52 to make the second contact section 5222 touch the first contact section 512 in a vertical direction. The first and second switch contacts 51, 52 mate with each other in the vertical direction by means of slider 31 abutting against the second switch contacts 52. In the process, the second hook 333 of the link rod 33 moves in the heart-shaped cam 311 of the slider 31 and the coiled spring 32 is compressed. When the memory card 8 is fully inserted into the memory card connector 100, the second hook 333 reaches a locking position of the heart-shaped cam 311. The locking portion 42 of the card lock member 4 mates with a notch 82 of the memory card 8. As a result, the memory card 8 can be stably retained in the memory card connector 100. When further exerting a forward force on the fully inserted memory card 8, the memory card 8 and the slider 31 move rearwards. The slider 31 returns to its initial position via the elastic force recovery of the coiled spring 32. At the same time, the second hook 333 moves from the locking position and the locking portion 42 of the card lock member 4 disengages with the notch 82 of the memory card 8, thereby the memory card 8 is ejected from the memory card connector 100. As a result, the first and second switch contacts 51, 52 disengage with each other.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A memory card connector, comprising:
   an insulative housing defining a card receiving cavity and a side wall, the side wall defining a cutout and a protrusion extending into the cutout to form a retaining aperture below the protrusion; and
   a contact module comprising a plurality of contacts with a plurality of contact portions protruding into the card receiving cavity and a beam integrally molded with the contacts, the beam comprising a side portion received in the cutout, the side portion comprising a projecting block received in the retaining aperture.

2. The memory card connector according to claim 1, wherein the side wall of the insulative housing comprises another protrusion extending into the cutout to form another retaining aperture below the another protrusion, the side portion of the beam comprising another projecting block received in the another retaining aperture.

3. The memory card connector according to claim 2, wherein the projecting block and the another projecting block extend from a bottom edge of the side portion.

4. The memory card connector according to claim 2, wherein the projecting block and the another projecting block extend along opposite directions.

5. The memory card connector according to claim 1, wherein the beam comprises a horizontal main portion with the side portion downwardly extending from a lateral edge of the main portion, the main portion being supported by the side wall of the insulative housing.

6. The memory card connector according to claim 5, wherein the insulative housing comprises another side wall opposite to the side wall, the another side wall defining another cutout and a third protrusion extending into the cutout to form a third retaining aperture below the third protrusion, the beam comprising another side portion extending from another lateral edge of the main portion, the another side portion comprising a third projecting block received in the third retaining aperture.

7. The memory card connector according to claim 6, wherein the contact comprises a plurality of soldering portions extending sidewardly beyond the side portion and the another side portion, respectively.

8. The memory card connector according to claim 1, further comprising a pair of switch contacts including a first switch contact and a second switch contact, the first switch contact comprising a first contact section, the second switch contact comprising a spring arm below the first contact section.

9. The memory card connector according to claim 8, further comprising a slider movably assembled to the insulative housing, the slider comprising a projection driven by an inserted memory card to abut against the spring arm so that the spring arm can contact the first switch contact in a vertical direction.

10. The memory card connector according to claim 9, wherein the projection comprises an actuation portion abutting against the inserted memory card and an extending portion perpendicular to the actuation portion to abut against the spring arm.

11. The memory card connector according to claim 8, wherein the slider comprises a body portion with the projection extending laterally from a front side of the body portion, the body portion defining a heart-shaped cam, and wherein the memory card connector further comprises a coiled spring with one end abutting against the insulative housing and the other end abutting against the slider, and a link rod comprising one hook retained in the insulative housing and the other hook movable in the heart-shaped cam.

12. A card connector comprising:
    an insulative housing;
    a first set of contacts and an ejection mechanism disposed in the housing;
    a contact module assembled to the housing and cooperating with the housing to form a confined card receiving cavity; and
    said contact module including an insulative beam with a second set of contacts embedded therein in an overmolded manner, said beam including a horizontal main portion with two opposite side portions extending therefrom; wherein the side portions experience lateral deflection during assembling the contact module to the housing, and said side portions are equipped with a tail portions of the second set of contacts therein not only for holding the tail portions in position for assuring true positions for soldering to a printed circuit board but also for reinforcing the side portions for resisting said lateral deflection during assembling.

13. The card connector as claimed in claim 12, wherein each of said side portions includes a projecting block for preventing upward movement of the beam.

14. The card connector as claimed in claim 12, wherein one of said side portions is equipped with only one projecting block while the other with two so as to result in differentiation for orientation consideration.

* * * * *